United States Patent [19]
Rowsell et al.

[11] Patent Number: 5,343,242
[45] Date of Patent: Aug. 30, 1994

[54] TESTING VIDEO EQUIPMENT

[75] Inventors: Christopher N. Rowsell, Basing; Stuart R. Monksfield, Camberley, both of United Kingdom

[73] Assignee: Sony United Kingdom Limited, Staines, United Kingdom

[21] Appl. No.: 38,805

[22] Filed: Mar. 29, 1993

[30] Foreign Application Priority Data

May 6, 1992 [GB] United Kingdom ............. 9209782.3

[51] Int. Cl.$^5$ ............................................ H04N 17/00
[52] U.S. Cl. ..................................... 348/181; 348/189
[58] Field of Search ..................... 358/139, 10, 230; 348/181, 188, 189, 182, 190, 183; 345/904; H04N 17/00, 17/02, 17/04

[56] References Cited

U.S. PATENT DOCUMENTS

| | | | |
|---|---|---|---|
| 3,585,440 | 6/1971 | Lee et al. | 358/139 X |
| 4,326,219 | 4/1982 | Griesshaber | 348/181 X |
| 4,568,975 | 2/1986 | Harshbarger | 348/189 |
| 5,091,773 | 2/1992 | Fouche et al. | 358/139 X |

*Primary Examiner*—Victor R. Kostak
*Attorney, Agent, or Firm*—William S. Frommer; Alvin Sinderbrand

[57] ABSTRACT

A compound video test signal for testing video apparatus, such as a video tape recorder, includes a plurality of at least three blocks each block including a set of constituent test signals, each of the set of constituent test signals being reproduced in corresponding segments in each of the blocks. Preferably, the number of blocks is the largest whole number defined by the number of lines in a video field divided by the product of the number of different constituent test signals and the minimum number of lines per segment required for analysis.

32 Claims, 6 Drawing Sheets

TESTING VIDEO EQUIPMENT

BACKGROUND OF THE INVENTION

1. Field of the Invention

The invention relates to methods and apparatus for testing video equipment and a video test signal for use therewith.

2. Description of the Prior Art

As with all other types of technology, it is desirable to test the performance, both during manufacture and during operation, of video equipment. In the case of equipment for use in broadcast and professional applications, a series of rigorous tests have been established. For example, a number of standard full-field video test signals need to be applied in order to fully test the equipment. The conventional full-field test signals take the form of full-field images. Examples of such images are vertical colour bar images, pulse and bar images, pedestal (grey scale) images, modulated staircase (e.g. 5-step) images, and multiburst (frequency response) images.

Traditionally, the application of the various test signals was a time consuming and labour intensive process as this was performed manually. In simple terms, the traditional process comprised storing a test signal on tape followed by replaying and analysing the recorded test signal, then repeating these steps for each of the test signals to be applied. To avoid having to repeatedly sequence through the stages of record, rewind and playback, an alternative approach was to store a series of test signals on the tape, rewind to the beginning and then playback once through all the separate test signals.

More recently, however, it has become common practice to employ automatic analysers to analyse the test signals output from the tape in order to enable more objective quantitative measurements of the performance of the equipment. Typically, when automatic analysis is employed, each test signal is taken in turn. In other words, a test signal is recorded on tape, the tape is then rewound, replayed and analysed. These steps are then repeated for the second test signal to be applied, the third test signal to be applied, and so on. With existing technology it is possible to control conventional signal generators to automatically generate the series of test signals to control the automatic analysers to analyse the series of test signals and to control the recording, rewinding and replay modes of the video tape recorder. However, it will be appreciated that this is still a time consuming process due, not least, to the need repeatedly to switch between the record, rewind and playback modes of the video tape recorder.

The alternative approach used with fully manual testing, namely recording a series of test signals in one go and then analysing the series of test signals, presents severe difficulties due to the need to tightly synchronise the record and playback modes to ensure that the analyser only carries out measurements when the correct signal is being replayed.

Figure 1:
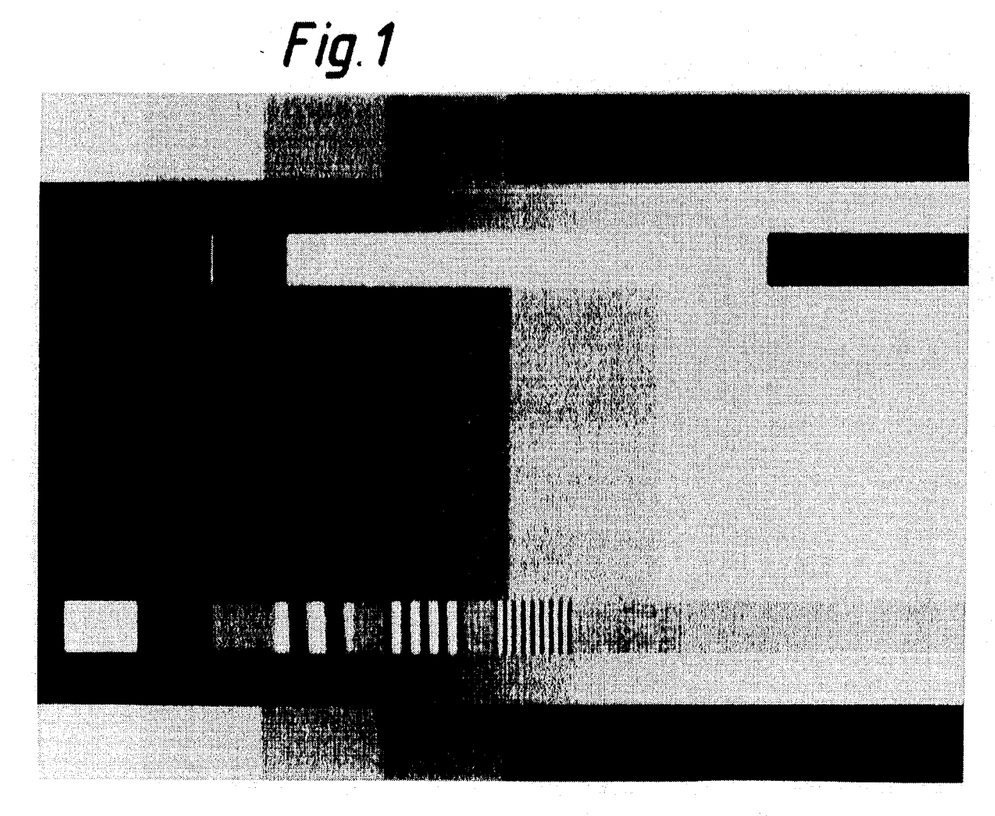
FIG. 1 is a monochrome representation of full-field matrixed test signals.

Test signal generators have been known for over a decade which generate complex test patterns formed as a matrix of different test signals within one field of a video image. The Tektronix 1411 video generator is able to produce a matrixed test signal which has parts of five of the standard full frame test signals used in the industry. This matrixed test signal, which in practice is in colour, is represented in monochrome in FIG. 1. The matrixed test signal comprises the following test signals: colour bars 12; shallow ramp 14; pulse and bar 16; modulated staircase 18 and multiburst 20.

Another matrixed test signal can be produced by the Tektronix TPG625, Option 01 PAL pattern generator. The full-field matrix composition of this signal includes parts of twelve separate test signals which are reproduced on the top half of the field and repeated in the bottom half of the field.

These matrixed test signals mean that it is possible to apply a number of test signals to a piece of equipment at one time. The matrixed test signals do not, however, attempt or enable full-field analysis over the whole video field in that any one of the test signals is only reproduced in a limited area of the video field. In other words, the matrixed test signals discussed above do not form a satisfactory replacement for the conventional full-field test signals.

Figure 2:
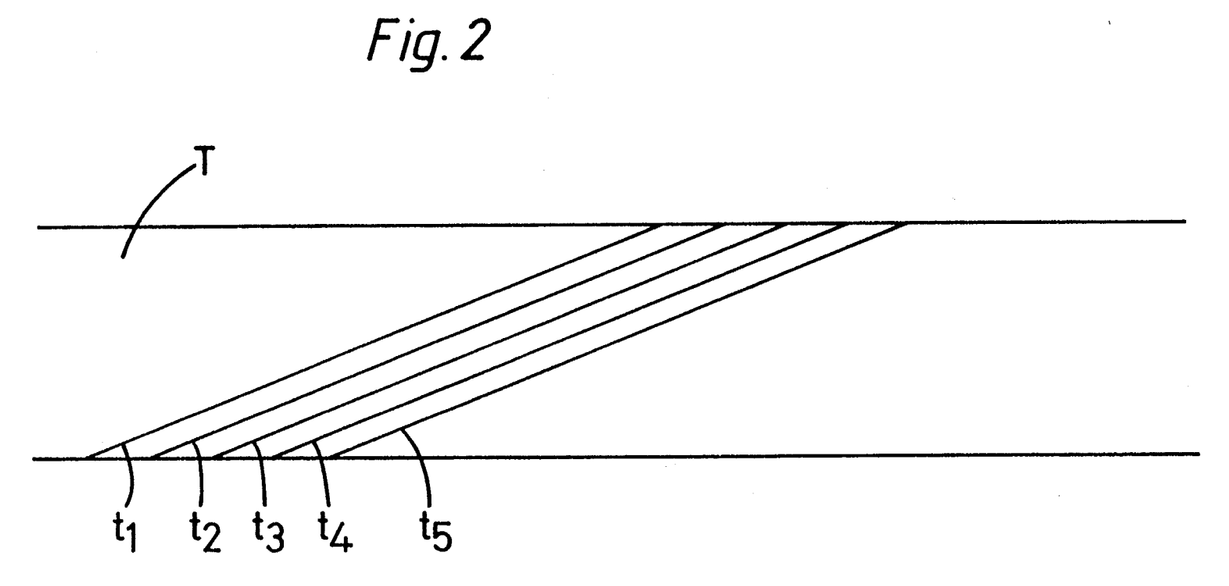
FIG. 2 is a schematic diagram of a video tape showing helically recording tracks.

In particular, these matrixed test signals are not suitable for testing the operation of video recorders. As known to the skilled person, video tape recorders typically record video information with a rotating head laying a helical track on a video tape. FIG. 2 represents a video tape T with helically recorded tracks t1, t2, t3, t4, t5, etc, thereon. It will be appreciated by the skilled person that in practice the tracks are much more closely spaced than indicated in FIG. 2. It is assumed that each track corresponds to a field of video information with the lines of the field from top to bottom being recorded sequentially from the bottom left to the top right of the track. In order to represent a full interlaced frame of video information, two fields (e.g. t1, t2) are recorded on the tape, typically in successive tracks.

With this technology it is not possible to guarantee an even recording level across the tape due to characteristics of the tape and the recording technology. Typically, stronger signals tends to be recorded near the middle of the tape than at the edges of the tape. In view of these technical limitations, the matrixed signals discussed above are not considered acceptable for fully testing the operation of video tape recorders, particularly high quality video tape recorders for broadcast and professional use. Accordingly, it has been necessary to continue using the traditional full-field test signals.

SUMMARY OF THE INVENTION

An object of the invention is, therefore, to mitigate the problem of prior art testing, in particular, of video tape recorders.

In accordance with a first aspect of the present invention, therefore, there is provided a compound video test signal for testing video apparatus, the compound video test signal comprising a plurality of at least three blocks wherein each block comprises at least a set of constituent video test signals, each of the set of constituent video test signals being defined in a corresponding segment in each of the blocks.

As will become clear from following description, a compound video test signal in accordance with the invention enables a full range of full-field measurements to be made with a single signal, so that there is no need to change the signal during recording, or wait for the right section during replay. In particular, it enables the performance of the video equipment under test to be measured at representative positions on the field, namely the top, the bottom and the middle of the video field. The analysis of each of the constituent video test signals can be performed substantially as if each of the constituent video test signals had been generated and processed as a full-field test signal, but without the need for accurate synchronisation of the equipment under test and the analyser.

Preferably, the number of blocks is the largest whole number defined by the number of lines in a field divided by the product of a predetermined number of segments and the minimum number of lines per segment required for analysis thereof. In this way the number of blocks can be maximised and the testing of the video field optimised. When testing the performance of a video tape recorder, for example, it is possible to test the performance of the recorder at many positions over the field and many positions over the width of the recording tape.

In a particular example of the invention for the testing of PAL 625 line video, each segment, with the exception of the top and bottom segments, occupies five lines, there are five segments per block (i.e. there are five constituent video test signals) and there are eleven blocks. The invention is not, however, limited in application to PAL 625 line video, but could be used with any other video standards, whether low, normal, or high definition, interlaced or non-interlaced.

In accordance with a second aspect of the present invention there is provided a method of testing video equipment comprising the steps of:

i) generating a compound video test signal as defined above;
ii) applying the compound video test signal to the equipment to be tested; and
iii) analysing the results of the application of the compound video test signal.

The invention enables the processing of the constituent full-field test signals without the complex synchronisation which would be necessary if conventional full-field test signals were used, as only one recording operation for the compound video test signal is needed. The length of the recording of the compound video test signal is set so as to enable the analysis of each of the constituent video test signals. For testing interlaced video operation, two compound video test signals are generated, one for each field. However, these two compound video test signals can be recorded and analysed in an interlaced manner as if they were one compound video test signal for a whole video frame. Thus, repeated switching between record, rewind and playback modes can be avoided. In a preferred embodiment of the invention where composite and component operation is tested, only one break in recording is required, namely between the composite and component operating modes.

Preferably, the step of analysing a component test signal comprises:

a) setting an initial offset in a line counter to a predetermined line within a first segment for the first constituent video test signal to be analysed;
b) scanning the lines of the video field until a line having the line identified by the count in the line counter is reached;
c) analysing this line;
d) incrementing the line counter by the number of scan lines per block and repeating steps (b) and (c) until all blocks have been covered for the constituent video test signal;
e) setting a new initial offset in the line counter to a selected line within the next segment for the next segment to be counted and repeating steps (b)-(d) for the next constituent video test signal, this step being repeated until all constituent video test signals have been analysed.

The analysis of the constituent video test signal can thereby be performed sequentially in the sense that the analysis can be performed for each of the constituent video test signals in turn. As with the prior art approach, the analysis of a constituent video test signal over the full-field is performed by processing and collating the results for selected lines of the field. However, whereas in the prior art approach it would normally be the same field line which would be processed for each of the video test signals, in the case of the invention the lines for successive constituent video test signals are displaced due to the different initial offset for each constituent video test signal.

In accordance with a third aspect of the present invention, there is provided apparatus for testing video equipment, the apparatus comprising a signal generator generating a compound video test signal as defined above, means for applying the compound video test signal to video apparatus under test and an analyser for analysing the resulting compound video test signal from the video apparatus under test.

Although the invention finds particular application for testing video recorders, it is not limited thereto, and could be used for testing other video storage devices and indeed other video equipment in general.

DESCRIPTION OF THE PREFERRED EMBODIMENTS

Figure 3:
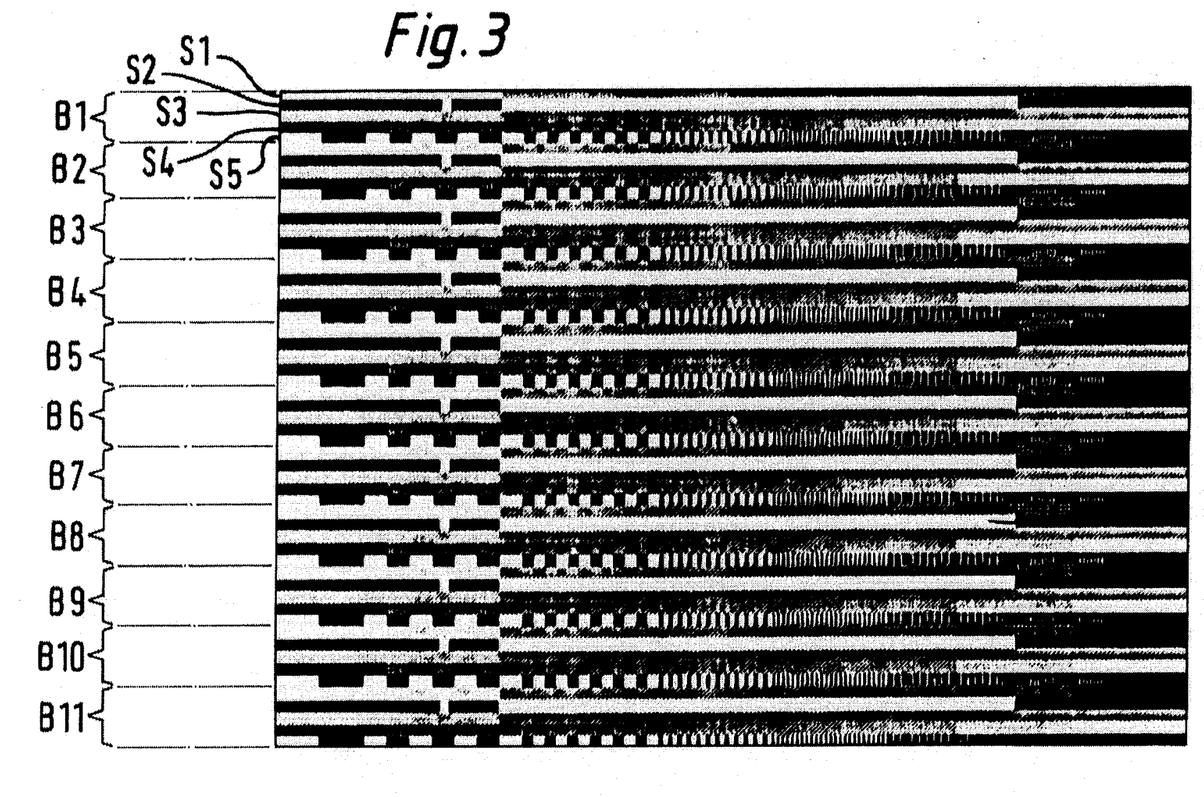
FIG. 3 is a monochrome representation of a compound video test signal in accordance with the invention.

FIG. 3 represents an example of a compound video test signal in accordance with the invention. FIG. 3 is reproduced in monochrome, although in practice the compound signal would be in colour. This compound video test signal occupies a complete video field but is made up of a large number of small portions of individual video test signals distributed over the full-field. The compound video test signal is formed from horizontally extending segments masked out of respective full-field test signals and mapped onto the resulting compound video test signal.

The example of a compound video test signal in accordance with the invention shown in FIG. 3 is intended for testing the operation of a video tape recorder in a PAL 625 line composite mode. The compound video test signal is divided into eleven blocks, B1–B11. Each of these blocks contains a set of five test signals, referred to herein in the context of the compound video test signal as the constituent video test signals. Each constituent video test signal is located within a corresponding segment S1–S5 in each block. That is, the first test signal is reproduced in the first segment of each block, the second constituent video test signal is reproduced in the second segment of each block, and so on. The test signals illustrated in FIG. 3 for the respective segments are:

S1- 100% colour bars;
S2- pulse and bar;
S3- 50% flat field (pedestal);
S4- staircase;
S5- multiburst.

In the example of FIG. 3 it is assumed that each segment includes 5 scan lines, with the exception of the top and bottom segments which include extra lines (6.5 at the top, 6 at the bottom) in order to completely fill the video field. The compound video test signal of FIG. 3 occupies a total of $(11 * 5 * 5) + + 6.5 + 6 = 287.5$ lines, that is all the lines of the active portion of one field ($2 \times 287.5 = 575$ lines) of a 625 line interlaced video frame. Thus, the compound video test signal enables the performance of the video equipment to be evaluated over the whole range of the video field with a plurality of separate standard or special test signals (here 5 standard test signals) without the disadvantages of having sequentially to record and replay the full-field test signals.

Although specific, standard, video test signals are represented in FIG. 3, the invention is not limited to these specific test signals. Other test signals can be used as the constituent video test signals for making up the compound video test signal as required for testing a particular piece of equipment. For example, for testing the operation of a video tape recorder in component mode, appropriate test signals well known to the person skilled in the art could be used. Moreover, the invention is not limited to the use of standard test signals for making up the compound video test signal: test signals specifically adapted for testing a particular characteristic of the equipment under test could be used.

More generally, the invention is not limited to the PAL 625 line system, but finds application in other television systems, including both standard definition and high definition systems, by adaptation of the number of blocks and/or the number of segments per block and/or the number scan lines per segment. However, in adapting the relationships between the numbers of blocks, segments and lines, it is important that a good distribution of the segments and thus of the constituent video test signals over the video field is achieved so that the performance of the video equipment over the full video field can be tested. When testing a video tape recorder, it is necessary to ensure that the upper, lower and middle portions of the tape are tested. In other words, it is necessary that at least three blocks are provided. Preferably, the number of blocks is maximised depending on the number of different tests which need to be performed (i.e. the number of segments per block which are required) and the ability of the test signal analyser to accurately perform the test measurements as will be explained later.

Figure 4:
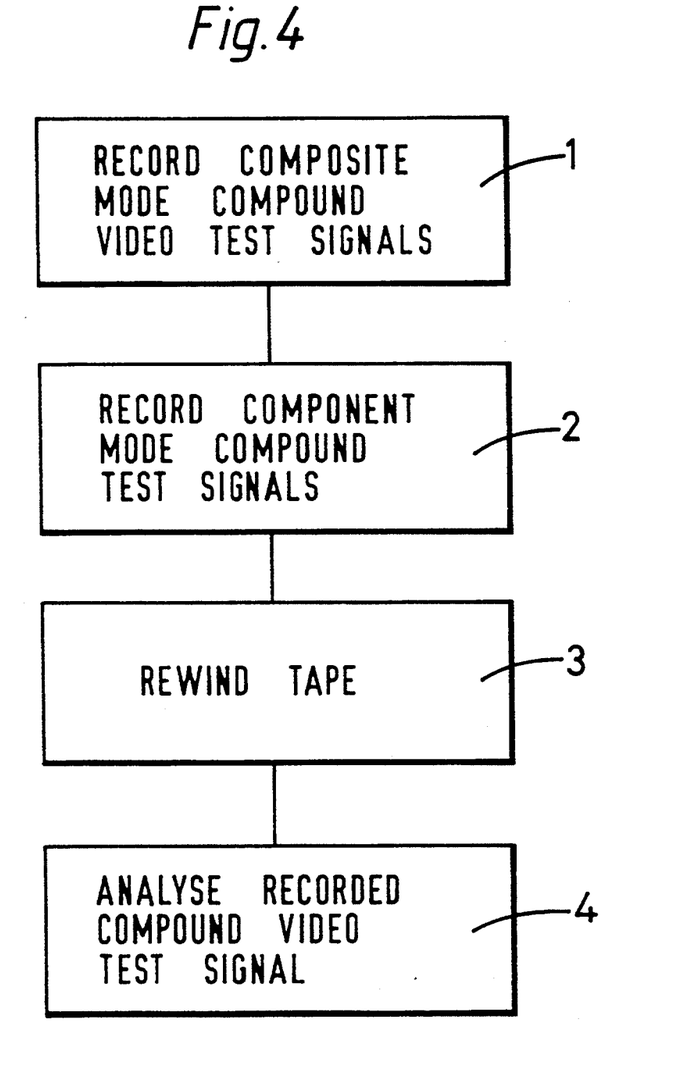
FIG. 4 is a flow diagram of the steps in testing a video tape recorder in composite and component modes.

FIG. 4 is an flow diagram of an overview of an example of a method of testing video equipment in accordance with the invention. In particular, FIG. 4 represents the basic steps in testing a video tape recorder in both composite and component signal modes. The method comprises the steps of:

Step 1: A compound video test signal for each field of interlaced video for composite mode operation such as that represented in FIG. 2 (but in colour) is recorded on a video tape using the video tape recorder to be tested. At the same time the analyser can be arranged to analyse the output of the signal generator to provide reference values for adjusting the subsequent analysis of the recorded compound video test signal.

Step 2: Following a break in recording a compound video test signal for each field of interlaced video for component mode operation is recorded on the video tape following the first recording. The analyser can likewise be arranged to analyse this component video signal from the signal generator to provide reference values for the subsequent analysis of the recorded compound test signal.

Step 3: The tape recorder is rewound to the start of the recording.

Step 4: The recording is replayed and test measurements are performed on the compound video test signals replayed from the tape.

Figure 5:
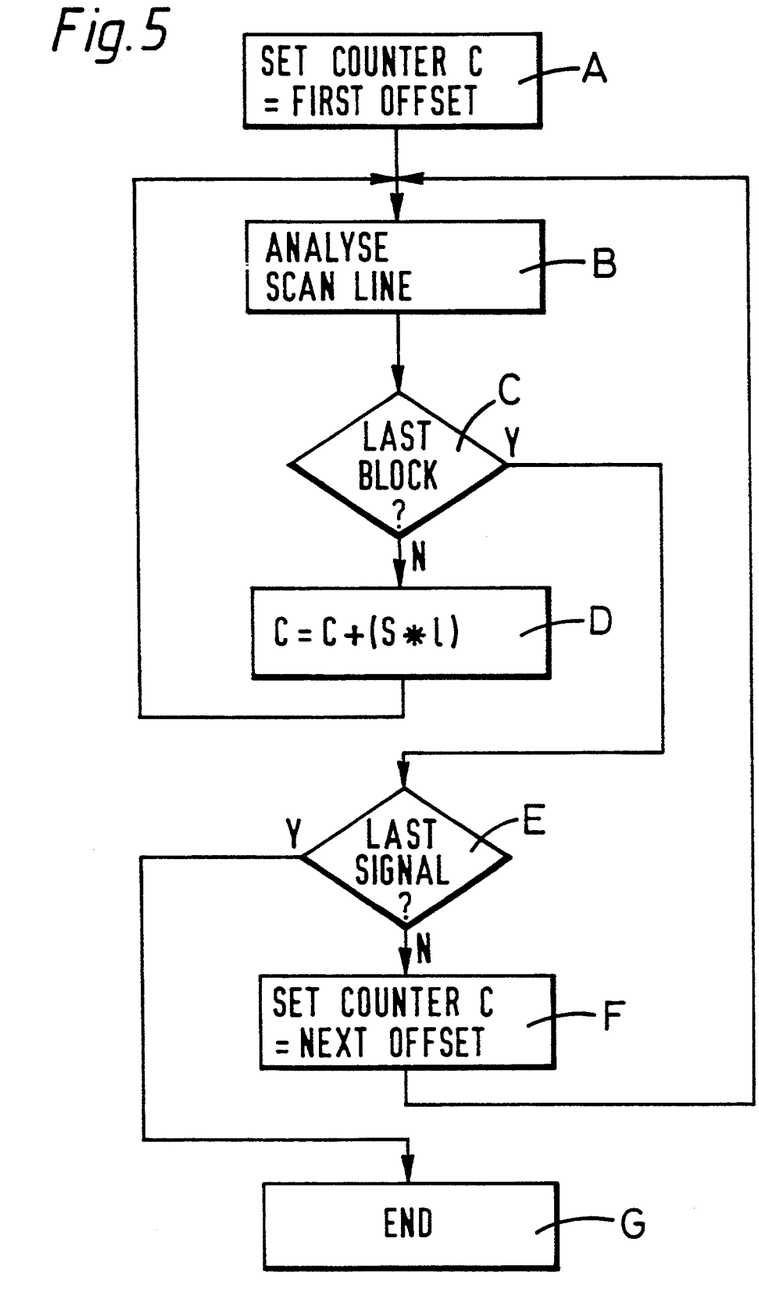
FIG. 5 is an expansion of the step of analysing a compound video test signal.

FIG. 5 illustrates in more detail the step of performing the test measurements (i.e. analysing the recorded compound video test signals).

When using conventional full-field test signals, a programmable analyser would be programmed to analyse selected lines from a full-field test signal by setting a particular initial offset and then stepping down the video field to perform measurements at selected scan lines of the video field. This type of operation is modified for analysing a compound video test signal in accordance with the invention in that this process is performed repeatedly for the respective constituent video test signals with a different initial offset being set for each of the constituent video test signals.

The analysis of the compound video test signal, that is step 4 of FIG. 4, comprises the following steps:

Step A: An initial offset is set in a line counter c to point to a selected line within the first segment (i.e. for the first test signal) in the first block to be analysed.

Step B: The analyser scans through the lines of the video field until a line having the line identified by the count in the line counter is reached, at which time this line is analysed. The analysis can take any conventional form for automated analysis of a full-field video test signal. The results of the calculations for any particular sampled scan line could be averaged with those of other scan lines for that test signal, processed to identify maximum or minimum values for given parameters, or processed in any other desired manner. The analysis for different constituent video test signals would not normally be combined with those for different constituent video test signals.

Step C: If the testing for the current test signal is not complete, (i.e. there is another block to be analysed) then the process proceeds to step B, otherwise to step D.

Step D: the line counter c is incremented by the number of lines per block (i .e. 1 * s, where l is the number of lines per segment and s is the number of segments per block).

Step E: If the there is another test signal to be analysed, then the process proceeds to step F, otherwise to step G.

Step F: An offset is set in a line counter c to point to a selected line within the next segment (i.e. for the next test signal) in the first block to be analysed and the process proceeds to step B.

Step G: The analysis of the compound video test signal is complete and the resulting values can be stored, output or processed further as required.

It can be seen, therefore, that the compound video test signal in accordance with the invention can be analysed in essentially the same manner as for conventional full-field video test signals by programming the analyser, for each of the constituent video test signals, with an appropriate starting line and the correct step value (which in the present example will be the same for each of the constituent video test signals, i.e. 1* S=25) and instructing it to make measurements on each step (here eleven steps). The average or best/worst value, as desired is then taken, depending on the measurements being made. In the preferred embodiment, for testing the two compound video test signals for interlaced operation, each of the constituent test signals of the compound video test signal for the first field are preferably analysed first, followed by those of the compound video test signal for the second field. This allows for easy adaptation of the method for testing different items of video equipment which may process the interlaced field in different ways (e.g. video tape recorders with different numbers of heads for recording and/or playback).

The particular line within a segment which is chosen for the analysis depends on the characteristics of the analyser. It has been found that the commercially available analysers require a settling time of a number of scan line before accurate and reliable measurements can be made. With the analyser currently being used it has been determined that five lines settling time is required before taking measurements. It was found that segments larger than five lines made little difference to the accuracy of the measurements made. Therefore five lines were chosen for the size of a segment, there being no advantage in having any more lines in a segment than the number needed for the settling time. Accordingly, in this embodiment of the invention the last line of a segment is that chosen for the measurements by the analyser.

Figure 6:
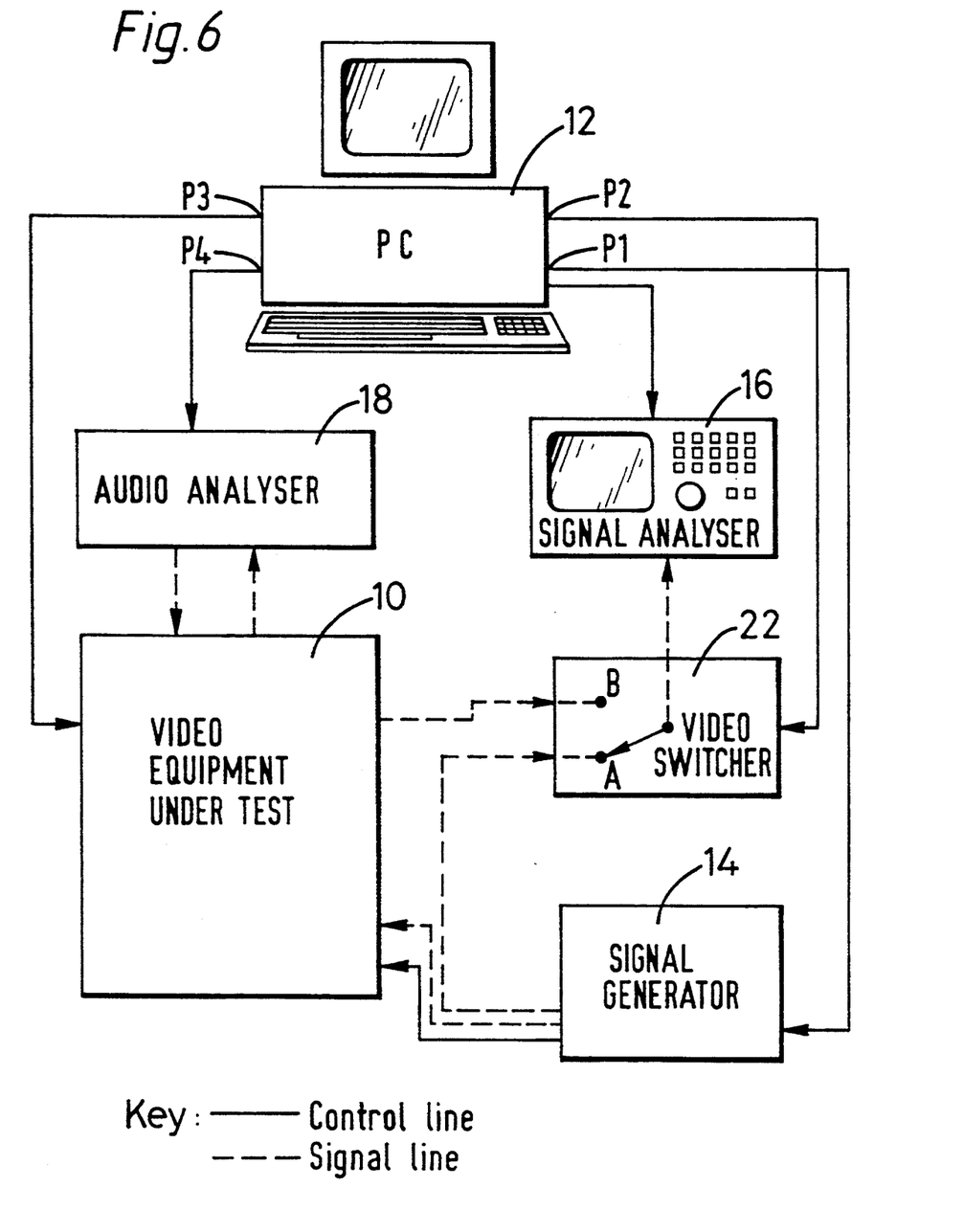
FIG. 6 is a representation of an apparatus for testing in accordance with the present invention.

FIG. 6 is a schematic block diagram of apparatus for testing, in accordance with the invention, video equipment such as, a video tape recorder 10. The apparatus is controlled by a controller 12, in the present embodiment a conventional personal computer with appropriate control software and hardware interfaces. The apparatus also includes a test signal generator 14 and a test signal analyser 16, both controlled via a RS-232 port P1 from the personal computer 12. Also shown in FIG. 6, but not relevant to the present invention, is an audio analyser 18 controlled via a port P4 from the personal computer 12. The audio analyser, such as an audio analyser manufactured by Audio Precision as Audio Precision System 1, will not be described in further detail herein.

The test signal generator 14 can be a conventional programmable video signal generator such as the Magni Signal Creator. This signal generator is provided with a software package allowing the user to create new test signal patterns. Although the present invention uses this test signal generator in a manner which is well known and understood by the skilled person for creating test signals, it should be noted that it is not known to generate a compound video test signal in accordance with the invention with this or any other equipment.

The signal analyser 16 can also be a conventional video signal analyser such as that marketed by Tektronix as the Tektronix VM-700A. All video measurements, both component and composite, can be performed using this video analyser. The analyser can be programmed in a manner which will be well known to the skilled person. In the present apparatus the analyser is programmed to perform the tests required by the method steps of FIGS. 4 and 5 under the control of the personal computer 12. In other words, for each of the constituent video test signals in the compound video test signal, the analyser is programmed with the appropriate starting line and the correct step value and instructed to make eleven measurements, the average or best/worst values being taken depending on the measurements being made.

The measurements are based on the comparison of reference values (typically a copy of the compound video test signal as directly output by the signal generator) to the compound video test signal output from the video equipment under test. The arrangement of the video switcher allows the switching the signals from the video generator and/or the video equipment under test to the video analyser in a manner which will be apparent to one skilled in the art. By using the output from the video generator as the reference, the video analyser is able to compensate for deviations of the signals from standard values due, for example, to operating conditions (temperature, humidity, etc.).

The signal generator and the signal analyser allow the processing of both composite and component video signals. Thus, it is possible to test the operation of a video tape recorder operable in component and composite video modes. The video switcher 22 is used to feed the signal analyser with either the composite or component output of the equipment under test, or the output of the signal generator for calibration purposes. The video switcher can comprise conventional switching circuitry under the control of the personal computer via a 12 pin TTL parallel port P2. In position A the video switcher channels the output of the signal generator to the signal analyser. In position B it channels the output of the equipment under test to the signal generator. The video equipment under test, which is assumed to include a remote control input can be controlled by the personal computer via a RS-422 interface port P3.

From the above it can be seen that the use of a compound video test signal in accordance with the invention enables a full range of full-field measurements to be made with a single signal, so that there is no need to change the signal during recording, or wait for the right section during replay. The measurements are performed substantially as if each of the composite test signals were generated and processed as a full-field test signal. The processing of the constituent video test signal by the analyser can still be performed sequentially in the sense that the analysis can be performed for each of the composite test signals in turn. As with the prior art approach, the analysis of a video test signal over the full-field is performed by processing and collating the results for selected lines of the field. However, whereas in the prior art approach it would normally be the same field line which would be processed for each of the test signals, in the case of the invention, the lines for successive constituent video test signals are displaced due to the different initial offset for each constituent video test signal.

An important advantage of the present technique is that the processing of the constituent full-field test signals can be achieved without the complex synchronisation which would be necessary if conventional full-field test signals were used, as one compound video test signal only needs to be recorded on a tape and then played back therefrom. The length of the recording of the compound video test signal is set so as to enable the analysis of each of the constituent video test signals to be processed. Moreover, repeated switching between record, rewind and playback modes can be avoided. In the particular embodiment described, only one break in the recording was made, namely between the composite and component operating modes.

Another advantage of a compound video test signal in accordance with the invention means that it is easy to ensure that the average picture level (APL) is maintained at 50%, which is desirable.

Although the invention has been described with reference to specific examples, it will be appreciated that the invention is not limited to these examples.

For example, as mentioned above, it will be appreciated that other segment sizes and/or block sizes, and a different number of constituent video test signals may be employed. It will be also appreciated that the invention is applicable to the testing of video equipment in composite and component modes and in any television format, whether low, normal or high definition.

In the example described above, the compound video test signal corresponds to a video field for an interlaced video system. For testing non-interlaced video, a compound video test signal could be generated which corresponds to a video frame.

In the example of a compound video test signal described above, each of the blocks (with the exception of the top and bottom blocks where the top and bottom segment may occupy other than five scan lines) were identical. However, this need not be the case. One or more of the blocks may contain different or additional test signals. For example, the middle block on a field may contain an additional segment containing a marker test signal. The presence of an additional segment means that the analyser needs to be programmed to make the correct step when analysing the constituent video test signals. It will also have been noted that in the example of a compound video test signal described above, each of the constituent video test signals is different. However, this need not be the case. If desired, two or more of the segments in a block could contain parts of the same constituent video test signal (e.g. a pedestal signal). More than one of the constituent video test signals could be duplicated in this way. Once again, the stepping of the analyser could be programmed to accommodate this.

Moreover, in the particular embodiment described above, the analyser processes each constituent video test signal in turn. However, with a suitable analyser with for example, but not necessarily, separate processing channels, the constituent video test signals could be processed in parallel to further speed the process of testing the video equipment.

Although specific examples of the invention for use with the PAL 625 line standard have been described, it will be apparent to one skilled in the art how to adapt the described examples for use with, for example, the NTSC 525 line standard, or indeed with any normal or high definition standard.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A compound video test signal for testing video apparatus, the compound video test signal comprising at least three blocks wherein each block comprises a plurality of segments, each segment occupying a predetermined number of scan lines, the scan lines in a segment having a constituent video test signal selected from a set of constituent video test signals, one of the constituent video signals in a respective block being different from at least another of the constituent video signals in said respective block.

2. A compound video test signal for testing video apparatus, the compound video test signal having an active video region and comprising at least three blocks wherein each block comprises at least a set of constituent video test signals, each of said set of constituent video test signals being in a corresponding segment in each of said blocks, each segment occupying a predetermined number of scan lines, wherein segments adjacent top and bottom lines of said active video region may occupy a number of scan lines different from said predetermined number to fill completely the active video lines.

3. A compound video test signal for testing video apparatus, the compound video test signal comprising at least three blocks wherein each block comprises at least a set of constituent video test signals, each of said set of constituent video test signals being in a corresponding segment in each of said blocks, the number of blocks being the largest whole number defined by a number of lines in a field divided by the product of a predetermined number of segments and a minimum number of lines per segment required for analysis thereof.

4. A compound video test signal as defined in claim 3 wherein said minimum number of lines per segment is five.

5. A compound video test signal as claimed in claim 1 comprising eleven blocks.

6. A compound video test signal as claimed in claim 1 which corresponds to one field of interlaced video.

7. A compound video test signal as claimed in claim 1 which corresponds to a video frame.

8. A compound video test signal as claimed in claim 1 wherein each test signal of said set of test signals is different.

9. A compound video test signal as claimed in claim 1 wherein at least one test signal of said set of test signals is in at least two segments of a block.

10. A compound video test signal as claimed in claim 9 wherein said at least one test signal is a pedestal signal.

11. A compound video test signal for testing video apparatus, the compound video test signal comprising at least three blocks wherein each block comprises at least a set of constituent video test signals, each of said set of constituent video test signals being in a corresponding segment in each of said blocks, at least one block including a video test signal in addition to said set of test signals.

12. A compound video test signal as claimed in claim 11 wherein said at least one block is in the centre of the video field and said additional video test signal is a marker signal.

13. A compound video test signal for testing video apparatus, the compound video test signal comprising at least three blocks wherein each block comprises at least a set of constituent video test signals including at least one of the following test signals: a colour bar signal, a pulse and bar signal, a pedestal signal, a modulated staircase signal, a ramp signal and a multiburst signal, each of said set of constituent video test signals being in a corresponding segment in each of said blocks.

14. A compound video test signal as claimed in claim 1 for testing for composite video operation.

15. A compound video test signal as claimed in claim 1 for testing for component video operation.

16. A method as claimed in claim 15 wherein the same constituent video signal is in each of the scan lines of a respective segment.

17. A compound video test signal as claimed in claim 1 wherein the same constituent video signal is in each of the scan lines of a respective segment.

18. A method of testing video equipment comprising the steps of:
   generating a compound video test signal comprising at least three blocks wherein each block comprises a plurality of segments, each segment occupying a predetermined number of scan lines, the scan lines in a segment having a constituent video test signal selected from a set of constituent video test signals, one of the constituent video signals in a respective block being different from at least another of the constituent video signals in said respective block;
   applying said compound video test signal to the equipment to be tested; and
   analysing results of the application of said compound video test signal.

19. A method as claimed in claim 18 wherein: the step of generating comprises generating first and second compound video test signals each for a respective field of interlaced video; the step of applying comprises applying said first and second compound video test signals to the equipment to be tested; and the step of analysing comprises analysing results of the application of said first and second compound video test signals.

20. A method of testing video equipment comprising the steps of:
   generating a compound video test signal comprising at least three blocks wherein each block comprises at least a set of constituent video test signals, each of said set of constituent video test signals being in a corresponding segment in each of said blocks:
   applying said compound video test signal to the equipment to be tested; and
   analysing results of the application of said compound video test signal by:
   a) setting an initial offset in a line counter to a predetermined line within a first segment for said test signal to be analysed;
   b) scanning lines of video until a line identified by a count in said line counter is reached;
   c) analysing this line;
   d) incrementing said line counter by the number of scan lines per block and repeating steps (b) and (c) until all blocks have been covered for said test signal; and
   e) setting a new initial offset in said line counter to a selected line within a next segment for the next segment to be counted and repeating steps (b)-(d) for a next test signal, this step being repeated until all test signals have been analysed.

21. A method as claimed in claim 20 wherein said predetermined line is a scan line subsequent to a first scan line of each segment.

22. A method as claimed in claim 21 wherein said predetermined scan line is a last scan line of each segment.

23. A method of testing video storage apparatus comprising the steps of:
   generating a compound video test signal comprising at least three blocks wherein each block comprises at least a set of constituent video test signals, each of said set of constituent video test Signals being in a corresponding segment in each of said blocks;
   applying said compound video test signal to the apparatus to be tested; and
   analysing results of the application of said compound video test signal.

24. A method as claimed in claim 23 wherein the said apparatus is a video tape recorder.

25. Apparatus for testing video equipment, the apparatus comprising generator means for generating a compound video test signal comprising at least three blocks wherein each block comprises a plurality of segments, each segment occupying a predetermined number of scan lines, the scan lines in a segment having a constituent video test signal selected from a set of constituent video test signals, one of the constituent video signals in a respective block different from at least another of the constituent video signals in said respective block, means for applying the compound video test signal to video apparatus under test and means for analysing the resulting compound video test signal from said video equipment under test.

26. Apparatus as claimed in claim 25 wherein said means for analysing scans through the lines of said compound video test signal, analysis of a particular test signal being performed on a predetermined scan line in each segment for that constituent video test signal in each of said blocks.

27. Apparatus for testing video equipment, the apparatus comprising a signal generator generating a compound video test signal comprising at least three blocks wherein each block comprises at least a set of constituent video test signals, each of said set of constituent video test signals being in a corresponding segment in each of said blocks, means for applying the compound video test signal to video apparatus under test and an analyser for analysing the resulting compound video test signal from said video equipment under test, said analyser comprising a line counter and control means causing:
   a) an initial offset to be set in the line counter to a predetermined line within a first segment for a test signal to be analysed;
   b) the lines of said test signal to be scanned until a line having the line identified by a count in said line counter is reached;
   c) this line to be analysed;
   d) said line counter to be incremented by the number of scan lines per block and functions (b) and (c) to be repeated until all blocks have been covered for said test signal;
   e) a new initial offset to be set in said line counter to a selected line within the next segment for the next segment to be counted and functions (b)-(d) to be repeated for a next test signal, this being repeated until all test signals have been analysed.

28. Apparatus as claimed in claim 27 wherein said predetermined line is a scan line subsequent to a first scan line of each segment.

29. Apparatus as claimed in claim 27 wherein said predetermined scan line is a last scan line of each segment.

30. Apparatus as claimed in claim 25 wherein the means for analysing performs analysis of the compound video test signal by comparison to reference values.

31. An apparatus as claimed in claim 25 wherein the same constituent video signal is in each of the scan lines of a respective segment.

32. An apparatus as claimed in claim 25 wherein said predetermined number of scan lines in each segment is a function of a settling time of said means for analysing.

* * * * *